United States Patent

Shuey

[15] 3,652,791

[45] Mar. 28, 1972

[54] CIRCUITRY FOR DISTINGUISHING BETWEEN BACKGROUND AND INTELLIGENCE AREAS ON A DOCUMENT

[72] Inventor: David R. Shuey, Webster, N.Y.

[73] Assignee: Xerox Corporation, Stamford, Conn.

[22] Filed: May 6, 1970

[21] Appl. No.: 35,048

Related U.S. Application Data

[63] Continuation-in-part of Ser. No. 789,867, Jan. 8, 1969.

[52] U.S. Cl. ..........................178/7.1 R, 250/214 R, 330/29

[51] Int. Cl. ....................H04n 5/19, H01j 39/12, J03g 3/30

[58] Field of Search ..................178/7.1, 7.2, 6.6 R, DIG. 26, 178/7.3 E; 330/24, 29; 250/215, 214 R, 206

[56] References Cited

UNITED STATES PATENTS

| | | | |
|---|---|---|---|
| 3,515,803 | 6/1970 | Lorang | 178/7.1 |
| 3,488,604 | 1/1970 | Smilowitz | 330/29 |
| 3,533,006 | 10/1970 | Kubicz | 330/29 |
| 3,292,013 | 12/1966 | Golahny | 330/29 |
| 3,286,189 | 11/1966 | Mitchell et al. | 330/24 |
| 3,537,025 | 10/1970 | Baum et al. | 330/24 |
| 2,506,668 | 5/1950 | Haynes | 178/7.1 |
| 3,153,726 | 10/1964 | Murphy | 178/6.6 R |
| 3,274,335 | 9/1966 | Gray | 178/7.1 |
| 3,322,893 | 5/1967 | Townsend | 178/6.8 |
| 3,445,590 | 5/1969 | Dischert et al. | 178/7.2 |

*Primary Examiner*—Robert L. Griffin
*Assistant Examiner*—John C. Martin
*Attorney*—James J. Ralabate, John E. Beck and Irving Keschner

[57] ABSTRACT

In a facsimile system, apparatus for automatically adjusting the gain of a circuit connected to a document scanning photoreceptor so that information signals may be readily separated from the various shades of background reflected from the document being scanned. The apparatus includes an operational amplifier, the feedback loop of which, in a first embodiment, includes a field effect transistor. The gain of the operational amplifier is adjusted so that its output is at one of two levels, representing information or background signals, by controlling the signal applied to the gate electrode of the field effect transistor. In a second embodiment the effective load resistor of the photoreceptor is varied by interposing a field effect transistor between the photoreceptor and the input of the operational amplifier. The amplitude of the output signal of the operational amplifier is adjusted by controlling the signal applied to the gate electrode of the field effect transistor.

8 Claims, 5 Drawing Figures

INVENTOR.
DAVID R. SHUEY

BY Irving Keschner
ATTORNEY

CIRCUITRY FOR DISTINGUISHING BETWEEN BACKGROUND AND INTELLIGENCE AREAS ON A DOCUMENT

CROSS-REFERENCE TO RELATED APPLICATION

This Application is a continuation-in-part of U.S. Application Ser. No. 789,867, filed Jan. 8, 1969.

BACKGROUND OF THE INVENTION

A transceiver is a facsimile device capable of either transmitting or receiving video information over a transmission medium. Transceivers currently available may utilize synchronously rotating turrets having scan and print transducers, or heads, mounted on the periphery to scan and reproduce graphic information. The transceiver, when performing as a transmitter, optically scans graphic information on a document and converts the information from optical to electrical form. The electrical video information is transmitted over a suitable transmission medium to a receiver. The electrical video signal is applied to the receiver print head which reproduces the graphic information on a copy sheet.

The scanning systems of the facsimile transmitters presently in use require a photoreceptor upon which the image of a document being scanned is reflected. The photoreceptor generates electrical analog signals resulting from the reflected image incident thereupon of a magnitude proportional to the light intensity of the reflected image within the range of the spectral response of the photoreceptor. The undesirable characteristic inherent with photoreceptors and their attendent circuits is that they cannot adequately distinguish between the light modulation representing a relatively dark background and the printed intelligence on the document. The presence of a dark background may simply comprise colored paper. In other instances, the documents to be transmitted may have a white background with a colored portion inked thereon, with printed material being present on both the white and colored portions. In the transmission of the documents the darker background would be transmitted as "black" with the resultant loss of the printed material associated with the darker background.

Prior art systems have overcome this problem by providing manual controls in an attempt to electronically adjust the contrast sensitive parameters to produce a white copy for darker background portions of the document being scanned. This may result in the printed matter being lost on the darker background especially in those situations where the image density of the printed matter very nearly resembles the darker background. In this manner of background control, the continuous observance of an attendant to adjust the system for each document being transmitted is required.

In addition to the undesirable photoreceptor characteristic listed hereinabove, the photosensitivity of each photoreceptor may vary from manufacturer to manufacturer and from one production run to another. A higher sensitivity photoreceptor will generally have a higher capacitance associated therewith than a photoreceptor having a lower sensitivity. Therefore, a higher sensitivity photoreceptor operating into the same load resistor as a photoreceptor having a lower sensitivity will operate slower, although the output electrical signal amplitude is greater. Therefore, when the higher sensitivity photoreceptor scans a document line having a high information content, i.e., high resolution, the output response, or speed, of the photoreceptor would be slowed considerably.

SUMMARY OF THE INVENTION

This invention relates to improved facsimile systems and more particularly to a system which includes an automatic gain control circuit, the system comparing the electrical output of a photoreceptor, corresponding to the reflections from a document being scanned, with a reference voltage, and adjusting the gain of the circuit so that information signals may be more readily separated from various shades of background.

The system includes an operational amplifier, the feedback loop of which, in a first embodiment, includes a field effect transistor. The gain of the operational amplifier is adjusted so that its output is at one of two levels, representing information or background signals, by controlling the signal applied to the gate electrode of the field effect transistor. In a second embodiment, the effective load resistor of the photoreceptor is varied by interposing a field effect transistor between the photoreceptor and the input of the operational amplifier. The amplitude of the output signal of the operational amplifier is adjusted by controlling the signal applied to the gate electrode of the field effect transistor.

It is an object of the present invention to provide an improved facsimile transmitter.

It is a further object of the present invention to provide a facsimile system which automatically distinguishes between light modulations representing background and printed intelligence on a document being scanned.

It is still a further object of the present invention to provide circuitry for automatically adjusting the parameters of a facsimile transmitter to produce a white copy for darker background portions of a document being scanned.

It is still a further object of the invention to provide novel circuitry for adjusting the parameters of a facsimile transmitter so that information signals may be more readily separated from various shades of background on a document being scanned.

It is still a further object of the present invention to provide a novel facsimile circuit for automatically separating information from background on a document being scanned, said circuit including an operational amplifier having a field effect transistor connected, in a first embodiment, in its feedback loop, the gain of said operational amplifier being adjusted by controlling the voltage applied to the gate electrode of said field effect transistor. In a second embodiment, the effective load resistor of the scanning photoreceptor is varied by interposing a field effect transistor between the photoreceptor and the input of the operational amplifier. The amplitude of the output signal of the operational amplifier is adjusted by controlling the signal applied to the gate electrode of the field effect transistor.

BRIEF DESCRIPTION OF THE DRAWINGS

For a better understanding of the invention as well as other objects and further features thereof, reference is made to the following description which is to be read in conjunction with the accompanied drawings and wherein.

DESCRIPTION OF THE PREFERRED EMBODIMENTS

Figure 1:
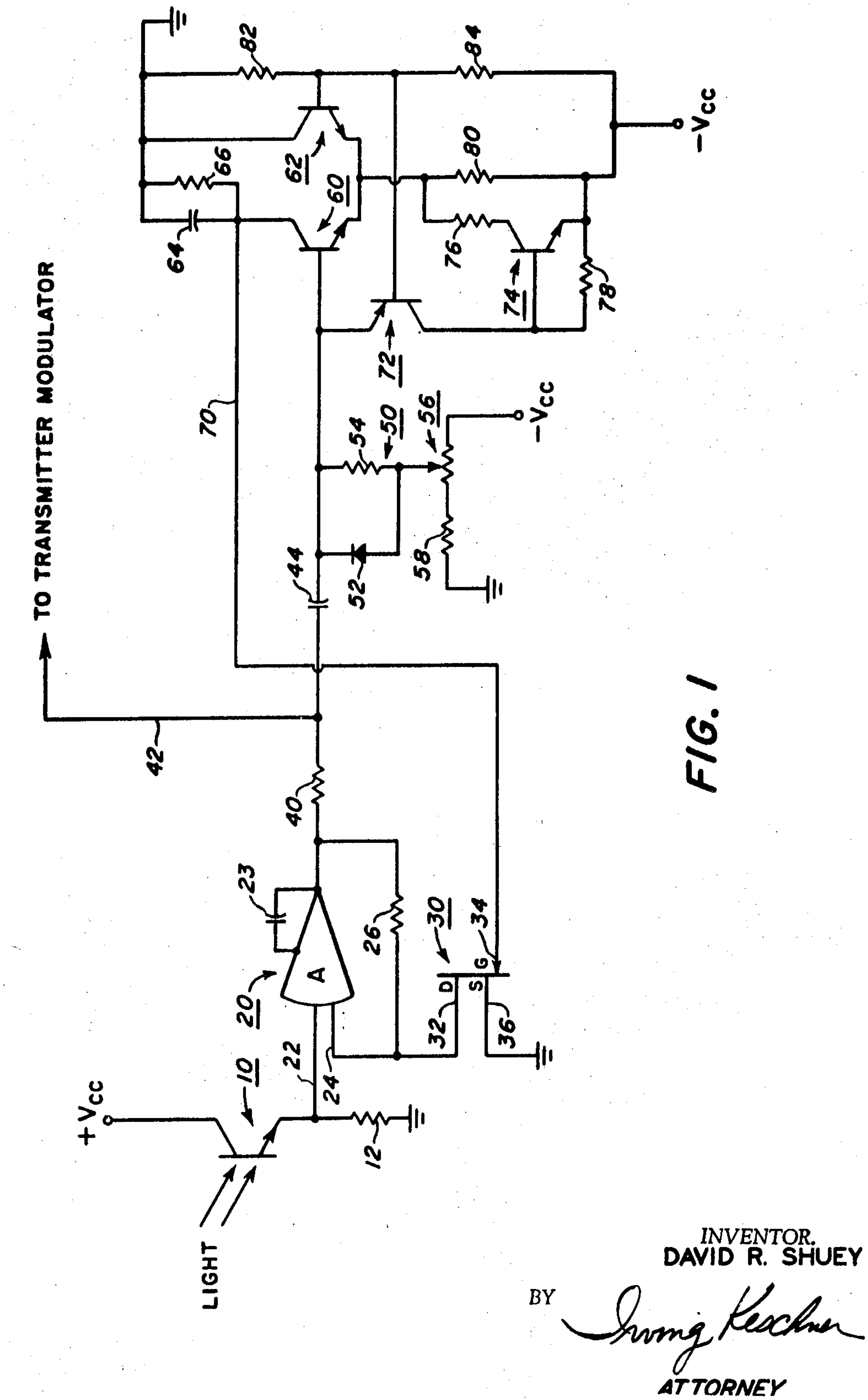
FIG. 1 is a partial schematic of the novel circuit of a first embodiment of the present invention.

Referring now to FIG. 1, there is shown a partial schematic of the novel circuitry utilized in a first embodiment of the facsimile transmitter of the present invention. Light reflected from or transmitted through the surface of a document being scanned is focused upon a photoreceptor 10, such as the double junction photosensitive semiconductor circuit illustrated. The collector electrode of the semiconductor circuit is connected to a source of potential +Vcc while the emitter electrode is connected to ground via resistor 12. The operation of semiconductor 10 may be compared to that of a junction transistor amplifier connected in an emitter follower configuration. The reflected light striking the first PN-junction may be considered equivalent to a signal applied to the emitter-base junction of the transistor amplifier. The output at the emitter of semiconductor 10 is coupled to the non-inverting input of high gain operational amplifier 20 via lead 22. The operational amplifier 20 is shown in block form. The specific details of operational amplifier 20 has not been set forth since they are well known in the art. Capacitor 23 is utilized for frequency compensation to prevent amplifier instability. The output of amplifier 20 is coupled to the inverting input thereof via lead 24 and resistor 26. The drain electrode 32 of a field effect transistor 30 is also connected to the inverting input of amplifier 20 via lead 24. The source electrode 36 of field effect transistor 30 is connected to ground. It is noted that the gain of operational amplifier 20 in the feedback configuration illustrated, $G_{20}$ is approximately equal to:

$$G_{20}=-R_f/Ri$$

wherein $R_f$ = the effective impedance in the feedback path and $Ri$ the effective impedance from input to ground of amplifier 20 and assuming the gain of the operational amplifier is very large.

Therefore, in the circuit illustrated, the amplifier gain is approximately equal to $$-R_{26}/R_{DS}$$

wherein $R_{26}$ is the resistance value of resistor 26 and $R_{DS}$ is the effective impedance between the drain and source electrodes of field effect transistor 30. The value of $R_{DS}$ is controlled by the voltage applied to the gate electrode 34 of field effect transistor 30 as will be described hereinafter.

The output of operational amplifier 20 is coupled to output lead 42 and capacitor 44 via resistor 40. The output lead 42 is coupled to the facsimile transmitter modulator for transmission to a facsimile receiver. Capacitor 44 AC couples the output of operational amplifier 20 to the base electrode of transistor 60 via DC restorer 50. The DC restorer 50 comprises diode 52, resistor 54, variable potentiometer 56 and resistor 58. The emitter electrode of transistor 60 is directly coupled to the emitter electrode of transistor 62. The collector electrode of transistor 60 is coupled to ground via the parallel combination of capacitor 64 and resistor 66. The collector electrode of transistor 60 is also coupled to the gate electrode 34 of field effect transistor 30 via lead 70. The base electrode of transistor 60 is connected to the emitter electrode of transistor 72, the collector electrode of which is coupled to the base electrode of transistor 74. The collector electrode of transistor 74 is coupled to the emitter electrodes of transistors 60 and 62 via resistor 76 and the emitter electrode of transistor 74 is coupled to the base electrode thereof and to the emitter electrode of transistors 60 and 62 via resistors 78 and 80, respectively. Transistors 62 and 72 have a bias potential applied to their base electrodes by a voltage divider comprising resistors 82 and 84. A variable bias potential may be applied to the base electrodes of transistors 62 and 72, as in the second embodiment of the invention shown in FIG. 5.

Figure 2:
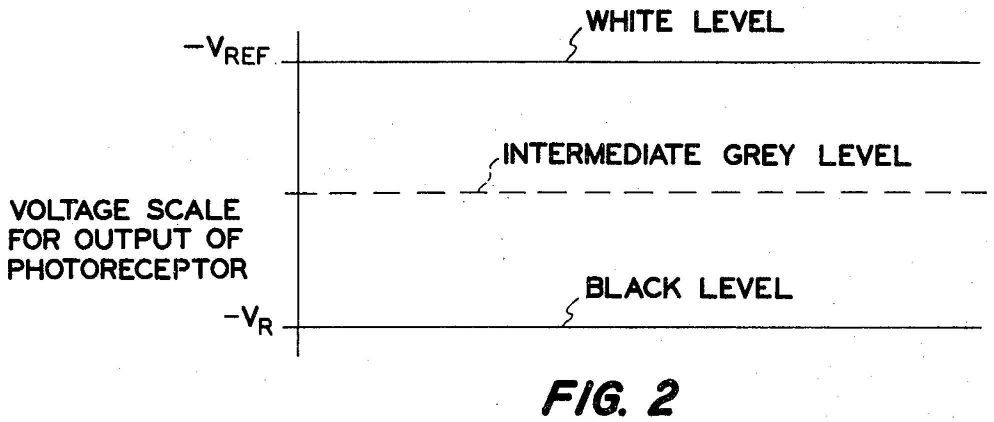
FIGS. 2, 3 and 4 are illustrative diagrams for explaining the operation of the circuit shown in FIG. 1.

In operation, the light reflected from the document being scanned impinges upon the base electrode of photosensitive semiconductor 10. At this point it is instructive to discuss the characteristics of the signal generated by the photosensitive semiconductor 10. As illustrated in FIG. 2, the signal levels of the circuit shown in FIG. 1 are chosen such that the most positive output generated by the semiconductor 10 corresponds to a white background on the document being scanned while the most negative output corresponds to scanning a black area, or intelligence information on the document. Intermediate backgrounds, such as grey, fall between the white and black output levels. The terms $V_{REF}$ and $V_R$, referring to the white and black levels, respectively, will be defined hereinafter. Aging of the document exposure lamp, dirt on the lens which focuses the reflected light on the base of the semiconductor 10 and photoreceptor sensitivity are exemplary of factors other than document information which can affect the light output of the photosensitive semiconductor.

Figure 3:
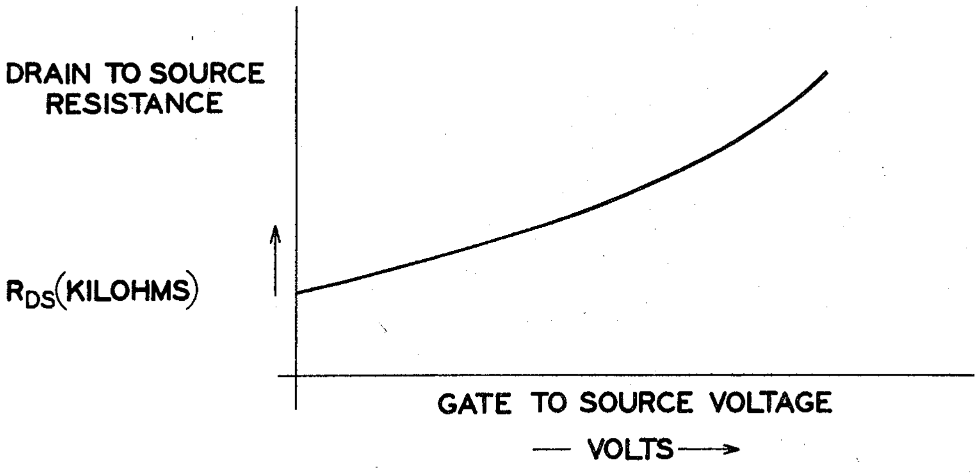

The voltage developed at the emitter of semiconductor element 10 is directly proportional to and in phase with the intensity of reflected light impinging upon its base. The emitter voltage is coupled to the non-inverting input of operational amplifier 20 via lead 22. The amplifier output is fed back to the inverting input via lead 24 and lead 26 and coupled to capacitor 44 via resistor 40. The DC component of the signal appearing at the output of amplifier 20, and removed by capacitor 44, is restored by DC restorer 50 which comprises the parallel combination of diode 52 and resistor 54 in series with variable potentiometer 56 and resistor 58. The restorer clamps the most negative transition of the signal appearing at its output to a fixed potential, $V_R$, which corresponds to black, or intelligence areas, on the scanned document. The restorer output is coupled to the base electrode of transistor 60. Transistors 60 and 62 are connected in a difference amplifier configuration and operate to generate a voltage at the collector of transistor 60 which is proportional to the difference of the voltage appearing at the base electrode of transistor 60 and the reference voltage applied to the base electrode of transistor 62 by the voltage divider formed by resistors 82 and 84. The reference voltage applied to the base electrode of transistor 62 effectively determines the most positive transition, $V_{REF}$, of the amplifier output signal. If the signal at the base electrode of transistor 60 is more positive than that appearing at the base electrode of transistor 62 and the difference is less than 1 volt, transistor 60 is caused to conduct and capacitor 64, initially uncharged, charges through resistor 80 and transistor 60. The negative decrease of voltage appearing at the collector electrode of transistor 60 is integrated by capacitor 64 and coupled to the gate electrode 34 of field effect transistor 30. The characteristics of field effect transistor 30, illustrated in FIG. 3, are such that the resistance between the drain and source electrodes, $R_{DS}$, increases as the signal applied to the gate electrode becomes more negative. Therefore, the increase in the voltage, of a negative polarity, appearing across capacitor 64, increases the drain to source resistance of operational amplifier 30, thereby decreasing the gain of operational amplifier 20. The output signal appearing at the base of transistor 60 is therefore decreased until it is equal to the signal appearing at the base of transistor 62. The gain of amplifier 20 is therefore automatically controlled such that a signal pulse of constant amplitude is generated at the output of amplifier 20. The amplifier output pulse is approximately equal to the difference between $V_{REF}$ and $V_R$.

Transistor 72 limits the base voltage of transistor 60 from going too far above the reference voltage applied to the base of transistor 62 which could cause instability. Transistor 72 is biased so that it is caused to conduct when the difference in base voltages is greater than 1 volt. Transistor 74, at the same time that transistor 72 is caused to conduct, also conducts and causes capacitor 64 to charge through the parallel combination of resistors 76 and 80, thereby increasing the charging rate thereof and correspondingly decreasing the signal appearing at the base of transistor 60.

If the voltage appearing at the base of transistor 60 is negative with respect to the reference voltage at the base of transistor 62, transistor 60 is non-conducting and capacitor 64 discharges through resistor 66. This decreasing negative voltage is coupled to gate electrode 34 of field effect transistor 30, decreasing the drain to source resistance, thereby increasing the gain of operational amplifier 20. The voltage appearing at the output of operational amplifier 20 is therefore increased until the voltages appearing at the base of transistors 60 and 62 are equal.

Figure 4:
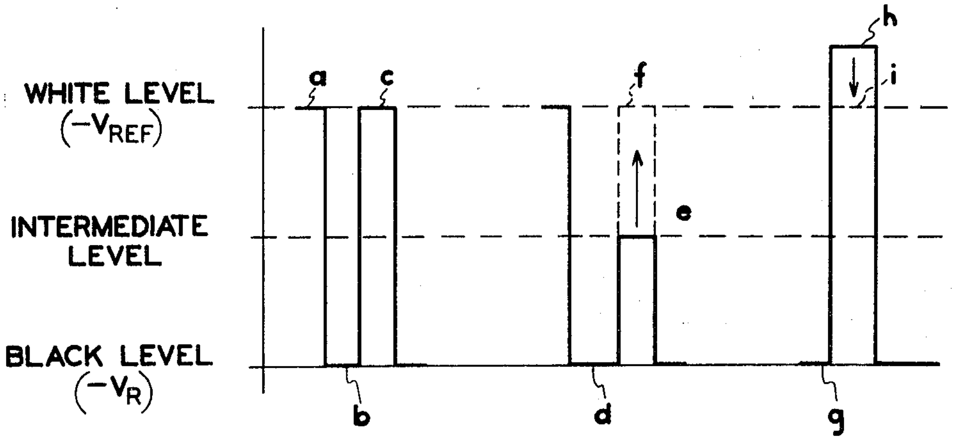

The above discussion can best be illustrated by referring to FIG. 4 which describes the effect of the amplifier gain control circuit on signals generated by semiconductor 10.

The output analog signals of the semiconductor 10 are ideally represented, for illustrative purposes, as pulses. The change in signal level from *a* to *b* represents the scanning of a black area after a preceding white area. The change in signal level from *b* to *c* represents the scanning of a white area on the document after a preceding black, or intelligence area. When the signal level changes from *d* to *e*, representing the scanning of an intermediate background level, such as grey or a colored background, from a preceding black area, the automatic gain control circuit described with reference to FIG. 1, becomes operative. The grey level signal is coupled to the base electrode of transistor 60, and being more negative than $V_{REF}$, the gain of operational amplifier 20 increases as described previously. The pulse level *e* is forced to level *f*, or white level, indicated by the dashed portions of the pulse. FIG. 4 indicates ideally that the change takes place instantaneously, although a finite time interval is actually required.

When the signal level changes from *g* to *h*, representing the scanning of a background level lighter in color than that set by $V_{REF}$, after a preceding black area, the automatic gain control circuit becomes operative. This corresponds to the condition when the voltage appearing at the base electrode of transistor 60 is more positive than $V_{REF}$ and the gain of amplifier 20 therefore is caused to decrease. The pulse level *h* is forced to level *i*, or white level, indicated by the dashed portions of the pulse.

Figure 5:
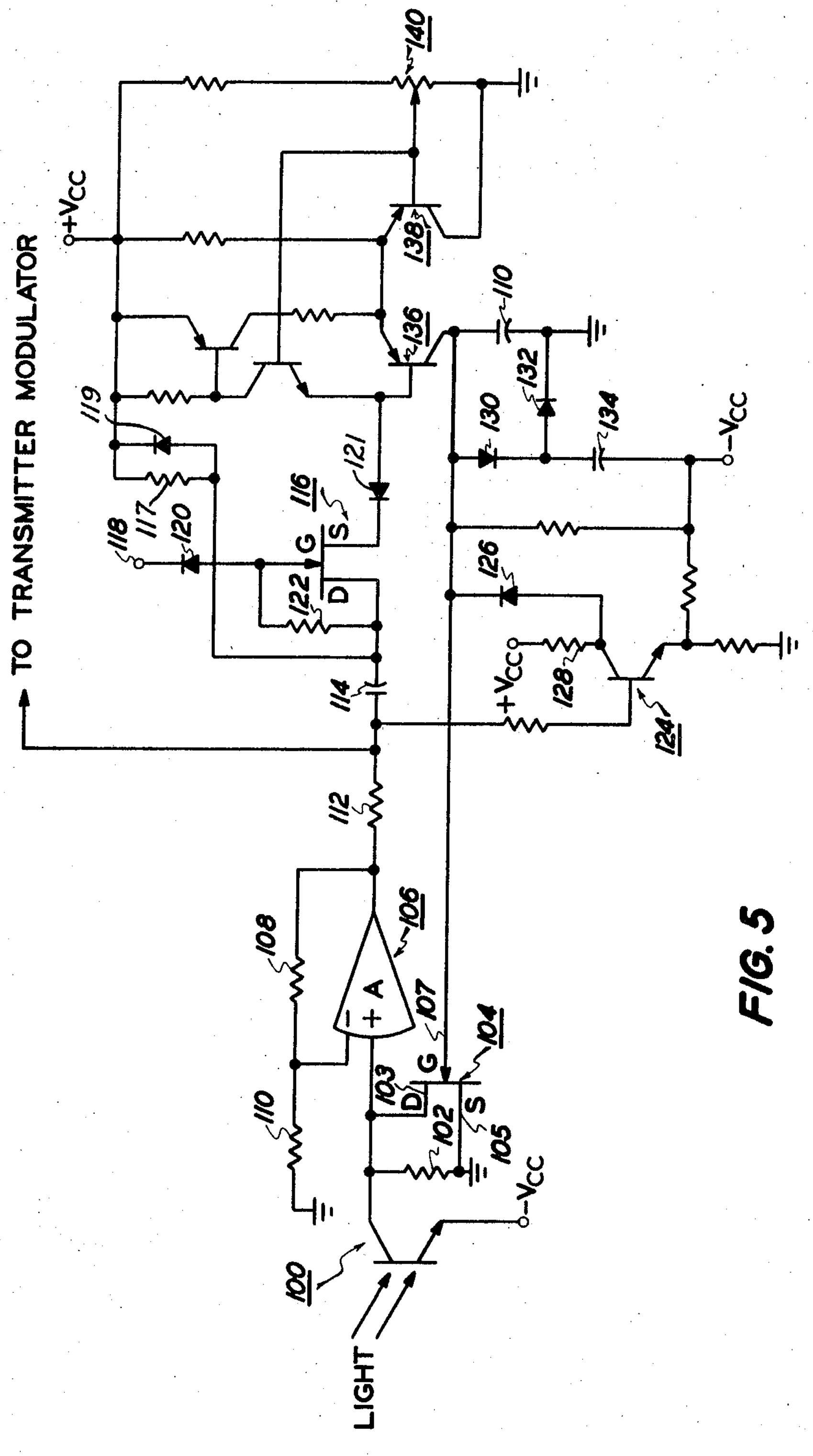
FIG. 5 is a partial schematic of the novel circuit of a second embodiment of the present invention.

Referring now to FIG. 5, there is shown a partial schematic of a second embodiment of the presention invention. This embodiment functions in a manner similar to that described with reference to FIG. 1 in that the output signal of the operational amplifier is maintained at either $V_{REF}$ or $V_R$. As set forth hereinabove, as the sensitivity of the phototransistor increases, the capacitance associated with its load resistor increases. Since the rise time of the pulses appearing at the output of the phototransistor is equal to product of the load resistor and the associated capacitance, it can be seen that scanning high information areas on the document would produce slow system response. To overcome this problem, the present embodiment, by utilizing a field effect transistor, effectively adapts the load resistance of the phototransistor to its sensitivity. In this case, if the sensitivity is high, the effective load resistance is decreased and vice versa.

Referring now specifically to FIG. 5, the light reflected from the scanned document impinges upon the base of phototransistor 100. Load resistor 102 is connected across phototransistor 100 and the emitter electrode thereof is connected to biasing potential −Vcc. A field effect transistor 104 has its drain and source electrodes 103 and 105, respectively, connected in parallel across load resistance 102, the drain electrode 103 being connected to the non-inverting input of operational amplifier 106. In this embodiment, the gain of the operational amplifier is fixed and proportional to the ratio of the resistance values, $R_{108}$ and $R_{110}$, of resistors 108 and 110, respectively, in the inverting feedback path of operational amplifier 106. Phototransistor 100 is basically a high impedance, constant current source and operates into load resistance 102 in parallel with field effect transistor 104. The impedance value of the field effect transistor between its drain and source electrodes is a function of the voltage on capacitor 110 which is coupled to the gate electrode of field effect transistor 104. The signal appearing at the output of operational amplifier 106 is coupled to the drain electrode of field effect transistor 116 via resistor 112 and capacitor 114. The field effect transistor 116 operates as a sample and hold circuit, the operation of which is initiated by a signal appearing at terminal 118. The sample and hold circuit 116 is utilized to make the circuits following it inoperative during transient situations in the actual machine embodiment which has not been described in detail herein. In point of fact, the elements 116, 118, 120, 122 and diode 121 may be eliminated and the lead connected to the cathode of diode 121 instead connected directly to the appropriate terminal of capacitor 114, the circuit described in FIG. 5 still being operative. With sample and hold circuit 116 as shown, a source of negative pulses is coupled to terminal 118, the pulse width of the pulses spanning the transient period. When the signal at terminal 118 is at ground, field effect transistor 116 is turned off and functions as a very high series impedance. The signal appearing at the output of operational amplifier 106 is thereby effectively disconnected from the difference amplifier comprising transistors 136 and 138. When the signal at terminal 118 goes positive, diode 120 is reverse biased and resistor 122 acts as a self-bias for field effect transistor 116, turning it on and allowing the operational amplifier output signal to be transmitted to the following circuitry. Transistor 124 prevents operational amplifier 106 from going into hard saturation. This is accomplished by sampling the DC level of its output. If the DC level of the output is greater than the reference voltage applied to the emitter electrode of transistor 124, transistor 124 is turned on and driven to saturation. The voltage at the collector electrode of transistor 124 reverse biases diode 126 and prevents transistor 124 from effecting the operation of the circuit. If the output of operational amplifier 106 drops below the voltage at the emitter electrode of transistor 124, transistor 124 is turned off and resistor 128 forward biases diode 126 and pulls the negative voltage on capacitor 110 toward a zero value. This decrease in negative voltage on capacitor 110 is coupled back to gate electrode 107 of field effect transistor 104, thereby decreasing the drain to source resistance (FIG. 3) of field effect transistor 104. This decreases the effective load resistance of phototransistor 100, thereby decreasing its output signal being applied to amplifier 106, removing it from its saturated condition. The circuit comprising diodes 130 and 132 and capacitor 134 is utilized only when power is initially applied to the apparatus. It has been determined that in the preferred mode of circuit operation, the output level of operational amplifier 106 at start-up should be maximized as the time required going from a large signal initially down to the controlled signal level is faster than going from a smaller signal to the controlled signal level. Before power turn-on, capacitors 110 and 134, in a series connection, are not charged. When power is turned on, the voltage divides between the capacitors and the anode side of diode 130 initially jumps to a value approximately one-half of −VCC, enough to turn off field effect transistor 104. When field effect transistor 104 is turned off, the drain to source impedance thereof is increased, thereby increasing the effective load resistance of phototransistor 100 and, in turn, the output signal generated by phototransistor 100. Since the signal may be too large, the signal is adjusted to its proper value through the action of the difference amplifier comprising transistors 136 and 138. As the output of operational amplifier 106 is adjusted to its proper value, capacitor 110 becomes negatively charged and controls the operation of the circuit. The negative voltage on capacitor 110 reverse-biases diode 130 and removes it from the circuit. When the power is removed from the circuit, (VCC going to 0 volts) the voltage built up across capacitor 134 is of a polarity to forward bias diode 132. Capacitor 134 discharges very rapidly via diode 132 to prepare for the next cycle of operation. If the output signal of operational amplifier 106 is very large, the output appearing at the collector electrode of transistor 136 would be positive which would forward-bias the gate electrode of field effect transistor 104, seriously damaging it. However, in this case, diodes 130 and 132 are actually forward biased and the collector voltage of transistor 136 is clamped to ground.

The operation of the other circuit elements have not been described in detail since their operation is identical to the corresponding circuit elements described in reference to FIG. 1, i.e., the resistor and diode 117 and 119, respectively, correspond to DC restorer 50 of FIG. 1, except for minor differences. For example, the transistors utilized in the difference amplifier of FIG. 5 are PNP types as compared to the NPN-types shown in FIG. 1. The power supply for PNP-transistors is positive, compared to negative power for NPN-transistors. In addition, the apparatus for biasing the base electrode of transistor 138 comprises an adjustable potentiometer 140 instead of the fixed bias shown in FIG. 1.

It can be seen from the description of the circuit operation described hereinabove, that the novel circuitry of the present invention provides a method of distinguishing between intelligence and background on a document being scanned. If the document area being scanned is different than a black area, the circuit operates to increase the amplitude of the output signal so that a white copy for the dark background portions of the document is produced. If the document area being scanned is lighter in color than the white level set by the parameters of the circuit, the amplitude of the output signal is decreased in magnitude so that a uniform background copy is produced.

While the invention has been described with reference to its preferred embodiment, it will be understood by those skilled in the art that various changes may be made and equivalence may be substituted for elements thereof without departing from the true spirit and scope of the invention. In addition, many modifications may be made to adapt a particular situation or material to the teaching of the invention without departing from its essential teachings.

I claim:

1. In a facsimile communication system for transmitting video signals representative of light transmitted through or reflected from an original being scanned, said original containing information and background areas, an improved circuit for automatically distinguishing said background and information areas comprising:

a photoreceptor for generating electrical signals proportional to the intensity of said light, variable impedance means connected to the output of said photoreceptor for varying the effective load impedance of said photoreceptor, amplifier means connected to the junction of said variable impedance means and said photoreceptor for amplifying said electrical signals, means connected to the output of said amplifier means for clamping the maximum negative transition of said electrical signals to a fixed potential, and a comparator circuit connected to the output of said clamping means for comparing the output thereof with a reference voltage, said comparator circuit generating an error signal when the output of said clamping means is different than said reference voltage, said reference voltage determining the maximum positive transition of said electrical signals, wherein the value of said variable impedance means is decreased when the output of said amplifier means is greater than said reference voltage and wherein the value of said variable impedance means is increased when the output of said amplifier means is less than said reference voltage whereby the output of said amplifier means is maintained at either said maximum positive or said maximum negative transition.

2. The circuit as defined in claim 1 further including a capacitor connected between the junction of said comparator circuit and the input to said variable impedance means, said capacitor integrating the error signal generated by said comparator circuit.

3. The circuit as defined in claim 2 wherein said variable impedance means includes a field effect transistor having drain, gate and source electrodes, said drain electrode being connected to the input of said amplifier and the output of said photoreceptor, said gate electrode being connected to said capacitor and said source electrode being connected to ground.

4. In a facsimile communication system for transmitting video signals representative of light transmitted through or reflected from an original being scanned, said original containing information and background areas, an improved circuit for automatically distinguishing said background and information areas comprising:

a photoreceptor for generating electrical signals proportional to the intensity of said light, amplifier means connected to the output of said photoreceptor for amplifying said electrical signals, said amplifier including means coupled to its input for automatically controlling the gain thereof, feedback means coupled to the output of said amplifier means for adjusting said amplifier gain control means, said feedback means comprising means connected to the output of said amplifier means for clamping the maximum negative transition of said electrical signals to a fixed potential, a comparator circuit connected to the output of said clamping means for comparing the output thereof with a reference voltage, said comparator circuit generating an error signal when the output of said clamping means is different than said reference voltage, said reference voltage determining the maximum positive transition of said electrical signals, wherein the gain of said amplifier means is decreased when the output of said amplifier means is greater than said reference voltage and wherein the gain of said amplifier means is increased when the output of said amplifier means is less than said reference voltage, a capacitor for integrating said error signal generated by said comparator circuit at a first charging rate, means for connecting said integrated error signal to said amplifier gain control means, and means connected to said comparator circuit for changing the charging rate of said capacitor if said error signal is greater than a predetermined voltage difference between said reference voltage and the output of said amplifier means, whereby the output of said amplifier means is maintained at either said maximum positive or said maximum negative transition.

5. The circuit as defined in claim 4 including means coupled to said comparator for selecting said predetermined voltage difference.

6. The circuit as defined in claim 5 wherein said comparator circuit includes first and second transistors, each transistor having base, emitter and collector electrodes, the emitters of each transistor being coupled together, the collector electrode of said first transistor connected to said capacitor, the base electrode of said first transistor being coupled to said clamping means, said reference voltage being connected to the base electrode of said second transistor.

7. The circuit as defined in claim 6 wherein said selecting means comprises a third transistor coupled between the base electrodes of said first and second transistors, the base electrode of said third transistor being connected to the base electrode of said second transistor, the collector electrode of said third transistor being coupled to the emitters of said first and second transistors and the emitter electrode of said third transistor being connected to the base electrode of said first transistor.

8. The circuit as defined in claim 7 wherein said charging means comprises a fourth transistor coupled between said third transistor and the emitter electrodes of said first and second transistors, the base electrode of said fourth transistor being connected to the collector electrode of said third transistor being, the collector electrode of said fourth transistor being coupled to the emitter electrodes of said first and second transistors and the emitter electrode of said fourth transistor being coupled to the base electrode thereof.

* * * * *